FIG. 1

INVENTOR.
DAVID W. MOORE JR.
BY Mueller, Dodds & Mason
ATTORNEYS

April 17, 1951     D. W. MOORE, JR     2,549,621
ELASTIC-FLUID TEMPERATURE-RESPONSIVE SYSTEM Filed July 13, 1945     2 Sheets-Sheet 2

INVENTOR.
DAVID W. MOORE JR.
BY Mueller, Dodds & Mason
ATTORNEYS

Patented Apr. 17, 1951

2,549,621

UNITED STATES PATENT OFFICE 2,549,621

ELASTIC-FLUID TEMPERATURE-RESPONSIVE SYSTEM

David W. Moore, Jr., New York, N. Y., assignor to Fairchild Camera and Instrument Corporation, a corporation of Delaware Application July 13, 1945, Serial No. 604,867

33 Claims. (Cl. 73—357)

This invention relates to elastic-fluid temperature-responsive systems and, while it is of general application, it is particularly suitable for the measurement of the temperature of the gases of extremely high temperature or extremely low temperature, such as the high-temperature gases in the combustion chamber of an internal combustion turbine or jet propulsion engine for aircraft and it will be described as applied to such an installation.

It is well known that the maximum theoretical thermodynamic efficiency of a heat engine is limited primarily by the maximum permissible temperature of the power fluid. In a reciprocating engine, the temperature of the combustion cylinder is to a large extent averaged over the complete operating cycle and adequate cooling can be provided so that the maximum temperature is actually limited by the maximum operating cylinder pressure or compression ratio.

In the case of internal combustion turbines and jet propulsion engines, however, the maximum combustion temperature is continuous at the high-pressure point of the engine and progressively decreases toward the exhaust. Therefore, the maximum permissible operating temperature of the high-pressure portion of the engine limits the maximum temperature of combustion and therefore the maximum theoretical efficiency and power output. Generally, this limiting temperature is determined by the maximum permissible temperature of operation of the high-pressure turbine blades which carry the maximum stress and are subject to the corrosive and erosive action of the combustion gases. In practice, this maximum temperature is at present within the range of 1700–3000° F. absolute.

The maximum temperature of combustion of an engine of the type under consideration is determined by the fuel and air input to the engine or, for a given throttle setting, by the fuel-to-air ratio. Obviously, therefore, it is desirable continuously to determine the temperature obtaining in the combustion chamber in order to set or control automatically the fuel-air ratio for any given throttle setting. However, there is not available at present for use under conditions prevalent in a gas turbine any satisfactory apparatus for measuring the temperature of the gaseous mixtures within the range of 1700–3000° F. absolute, which corresponds to a yellow-red color. Thermocouples and temperature-sensitive resistors rapidly deteriorate at such temperatures, while optical and other radiation-sensitive instruments are too delicate and cumbersome for such an application, particularly when applied to aircraft engines.

Furthermore, from a more general viewpoint, temperature-sensitive devices of the prior art virtually all are extremely slow acting due to the thermal inertia of the temperature-sensitive element, thus precluding the rapid determination of the gaseous temperature or the determination of a rapidly fluctuating temperature. This limitation is particularly troublesome when the temperature-sensitive device forms a part of an automatic control system in which the time lag of the device is cumulative with the time lags of other components of the system, the total of which may render the system too sluggish for acceptable performance.

It is an object of the invention, therefore, to provide a new and improved elastic-fluid temperature-responsive system which overcomes one or more of the above-mentioned disadvantages and limitations of the prior art arrangements of measuring high temperatures.

It is another object of the invention to provide a new and improved elastic-fluid temperature-responsive system which is simple, compact and rugged in construction and not subject to deterioration at the high temperatures involved.

It is another object of the invention to provide a new and improved elastic-fluid temperature-responsive system which is capable of responding to temperatures extremely remote from the ambient temperature, that is, either extremely high or extremely low, and difficult to determine directly.

It is another object of the invention to provide a new and improved elastic-fluid temperature-responsive system in which the response is substantially instantaneous, avoiding the thermal lag of conventional temperature-responsive devices.

It is another object of the invention to provide a new and improved elastic-fluid temperature-responsive system which relies upon the measurement of one or more of the other characteristics of the elastic fluid itself to derive an effect representative of its temperature.

In accordance with the invention, a system for deriving an effect representative of a temperature factor of an elastic fluid flow in a conduit and of a temperature remote from ambient temperature comprises means for developing an effect varying with the fluid flow of such high-temperature fluid in the conduit, means for changing the temperature of the fluid to a workable temperature, and means for controlling the fluid flow of the workable-temperature fluid to maintain constant a predetermined mass-flow factor including temperature, whereby the developed effect is representative of the desired temperature factor.

Further in accordance with the invention, a system for deriving an effect representative of a temperature factor of an elastic fluid flow in a conduit comprises means for developing a first effect varying with the volumetric flow of the fluid in the conduit, means for determining a predetermined mass-flow factor of the fluid flow through the conduit, and means for developing a second effect varying with the relative values of the volumetric flow effect and the mass-flow factor and representative of the temperature factor. In a preferred form of the invention as applied to a fluid of a temperature remote from the ambient temperature, heat exchanger means for changing the temperature of the fluid to workable temperature is interposed between the means for developing the volumetric flow effect and means for determining the fluid mass-flow factor.

In a preferred form of the invention, a system for deriving an effect representative of the temperature of an elastic fluid flow in a conduit comprises means for developing a first effect varying with the volumetric flow of the fluid in the conduit and means for developing a second effect varying with the static pressure in the conduit. The system also includes means for maintaining substantially constant the fluid mass flow through the conduit and means for developing a third effect varying with the product of the first two effects and representative of the desired temperature.

Further in accordance with the invention, the method of deriving an effect representative of a temperature factor of an elastic fluid flow in a conduit and of a temperature remote from ambient temperature comprises the steps of developing an effect varying with the fluid flow of the high-temperature fluid in the conduit, changing the temperature of the fluid to a workable temperature, and controlling the fluid flow of the cooled fluid to maintain constant a predetermined mass-flow factor including temperature, whereby the developed effect is representative of the desired temperature factor.

Further in accordance with the invention, the method of deriving an effect representative of a temperature factor of an elastic fluid flow in a conduit comprises the steps of developing a first effect varying with the volumetric flow of the fluid in the conduit, determining a predetermined mass-flow factor of the fluid flow through the conduit, and developing a second effect varying with the relative values of the volumetric flow effect and the mass-flow factor and representative of the temperature factor. In a preferred embodiment of the invention as applied to a fluid of a temperature remote from the ambient temperature, the method includes the step of changing the temperature of the fluid to a workable temperature prior to determining the fluid mass flow.

Further in accordance with a specific embodiment of the invention, the method of deriving an effect representative of the temperature of an elastic fluid flow in a conduit comprises the steps of developing a first effect varying with the volumetric flow of the fluid in the conduit, developing a second effect varying with the static pressure in the conduit, maintaining substantially constant the fluid mass flow through the conduit, and developing a third effect varying with the product of the first two effects and representative of the desired temperature.

For a better understanding of the invention, together with other and further objects thereof, reference is had to the following description taken in connection with the accompanying drawings while its scope will be pointed out in the appended claims.

Referring now to the drawings, Fig. 1 is a complete diagram, partially schematic, showing a high-temperature elastic fluid temperature-responsive system embodying the invention for measuring the temperature of the combustion gases of a jet propulsion engine; while

Figure 1:
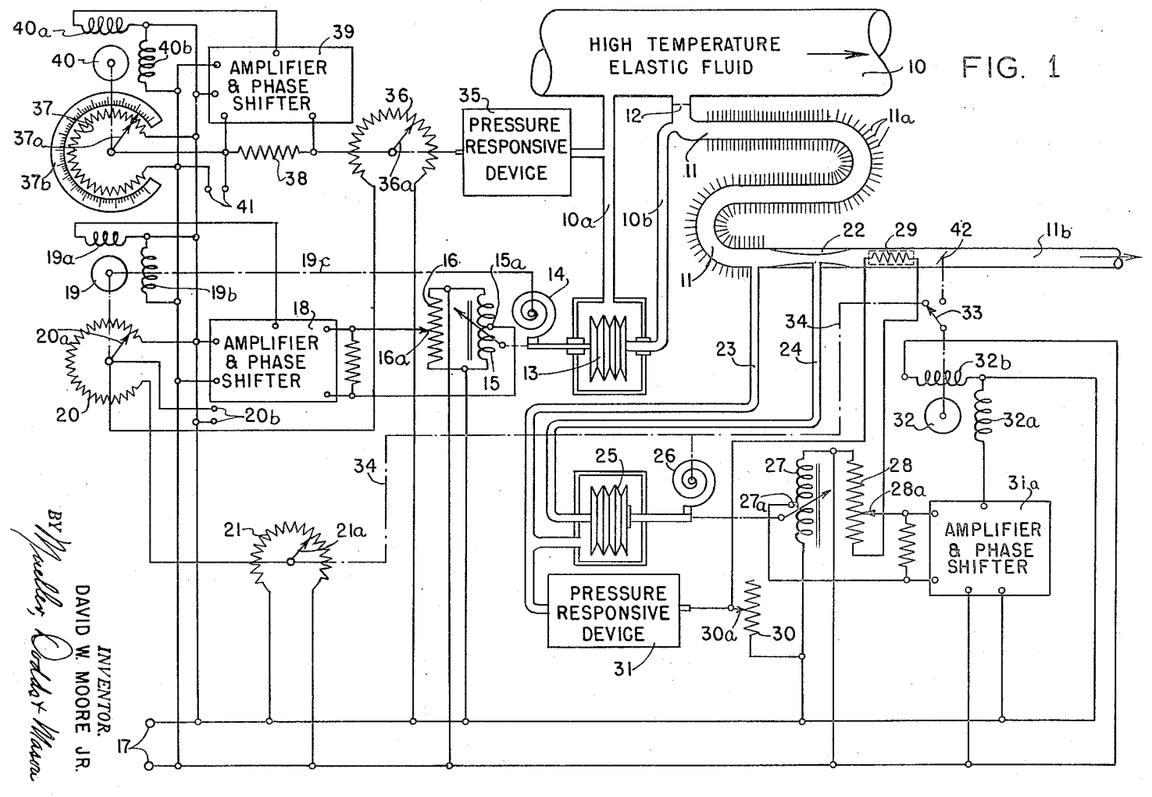

Referring now to Fig. 1 of the drawings, there is represented a system for deriving an effect, that is a visual indication, a mechanical control displacement or an electrical signal, representative of a temperature factor of a high-temperature elastic fluid flow in a conduit 10. Before considering the details of the system, it will be helpful to consider the underlying theory on which the operation of the system is based. The temperature of the fluid in the conduit 10, which may be within the temperature range of 1700–3000° F. absolute, cannot be measured directly for the reasons discussed above. However, if a relatively small quantity of this fluid is bled off through a conduit containing a differential-pressure developing device, such as an orifice, other constants of the fluid can be measured or determined and the temperature of the fluid derived from such factors. For example, a small quantity of the fluid may be bled off through an auxiliary conduit 11, preferably of considerable length and including the cooling fins 11a or other means for cooling the fluid to a workable temperature, that is, to a temperature such that it may be applied to ordinary measuring and controlling devices. The auxiliary conduit 11 terminates in a portion 11b which exhausts to the atmosphere. If the invention is applied to an aircraft jet propulsion engine, the portion of the conduit 11 provided with fins 11a should be mounted in the cool air entering the jet engine and this cooling means should be designed with an over capacity so that the temperature of the exhaust gases through the conduit 11b remains very nearly constant or stable, facilitating a rapid operation of the system as described hereinafter.

If a differential-pressure device, such as an orifice 12, is inserted in the conduit 11, it can be shown that the mass flow through the conduit is represented by the equation:

$$w = kA\sqrt{hw\left(\frac{P}{TR}\right)} \qquad (1)$$

from which temperature of the fluid may be expressed by the equation:

$$T = \frac{Ph_w}{\left(\frac{w}{kA}\right)^2 R} \qquad (2)$$

and since $$D = \frac{P}{TR} \qquad (2a)$$

$$D = \left(\frac{w}{kA}\right)^2 \frac{1}{h_w} \qquad (3)$$

where:

$w$ = mass flow in pounds/unit time
$h_w$ = differential pressure across orifice 12
$P$ = static pressure of fluid
$T$ = absolute temperature of fluid
$A$ = area of orifice 12
$R$ = gas constant
$D$ = gas density
$k$ = orifice constant If the mass flow $w$ is maintained constant, then $$\left(\frac{w}{kA}\right)^2$$

may be replaced by a constant C, resulting in the relations:

$$T = CPh_w \quad (4)$$

$$\frac{1}{D} = \frac{h_w}{C} \quad (5)$$

Equation 4 is based on the assumption that the gas constant R for the fluid under consideration remains constant; should this not be the case an empirical relationship can be determined. This gas constant is defined by the relation:

$$R = \frac{1544}{m}$$

where $m$ = molecular weight of the fluid mixture. The gas molecular weight of the normal combustion mixture does ordinarily remain substantially constant for reasonable ranges of the fuel-to-air ratio, among other reasons because of the preponderance of the inert atmospheric nitrogen. Furthermore, jet propulsion engines generally operate with a considerable excess of air so that reasonable variations in the fuel-to-air ratio do not appreciably vary the gas content of the mixture. In other words, by maintaining constant the fluid mass flow $w$, the temperature of the fluid may be determined by measurement of only the static pressure in the conduit 10 and the differential pressure $h_w$ across the orifice 12, while the density may be determined solely by the measurement of the differential pressure $h_w$.

On the other hand, if it is not convenient or practicable to maintain constant the mass flow of the fluid through the conduit 11, this mass flow may be measured and the temperature determined by the relation:

$$T = C_2 \frac{Ph_w}{w^2} \quad (6)$$

and the density may be determined by the relation:

$$\frac{1}{D} = C_3 \frac{h_w}{w^2} \quad (7)$$

Returning now to Fig. 1, there is represented a system for deriving an effect representative of the temperature of the fluid in the conduit 10 in accordance with the method corresponding to either Equation 4 or Equation 6. The system of Fig. 1 includes means for developing an effect varying with the volumetric fluid flow in the conduit 11 which may be, for example, the differential pressure $h_w$ across the orifice 12. To this end, there is provided a differential-pressure bellows 13 connected by way of auxiliary conduits 10a, 10b to respond to the differential pressure across the orifice 12. The bellows 13 is connected to oppose the torque of a spiral spring 14 and is connected also to adjust an adjustable inductor 15 forming with a resistor 16 an impedance bridge connected across alternating-current supply terminals 17. The unbalance voltage of the bridge derived from the midpoints 15a and 16a of the inductor 15 and resistor 16, respectively, is applied to an amplifier and phase shifter 18, the output circuit of which is connected to a first phase winding 19a of a phase-responsive device, such as a two-phase motor 19, the other phase winding 19b of which is connected across the supply terminals 17, the amplifier 18 also being energized from these terminals. The motor 19 is connected by a mechanism indicated schematically at 19c to rewind the spring 14 to restore the bellows 13 and the adjustable inductor 15 to their normal positions and rebalance the bridge 15, 16. The motor 19 is also connected to an adjustable contact 20a of a voltage divided 20 connected across the supply terminals 17 in series with an adjustable portion of a voltage divider 21, included for a purpose described hereinafter. In other words, the components just described comprise means for adjusting the contact 20a of voltage divider 20 in response to the differential pressure across the orifice 12, that is in response to the fluid flow of the high-temperature elastic fluid through the conduit 11.

The system of the invention also includes means for determining the fluid mass flow of the cooled fluid flowing through the conduit portion 11b and means for developing an effect varying with the relative values of the volumetric flow effect and the mass flow and representative of a temperature factor of the high-temperature fluid. The means for determining the fluid mass flow may constitute means for deriving a second effect varying with a mass-flow factor including temperature of the cooled fluid, for example the actual mass flow itself. This means may comprise a voltage divider 21 having an adjustable contact 21a adjusted in accordance with the fluid mass flow through the conduit 11b, the divider 21 being connected across the supply terminals 17 and the electrical signal appearing at the adjustable contact 21a varying with the mass-flow factor or mass flow as described.

By the term "electrical signal," indicated as appearing at the contact 21a of voltage divider 21 and elsewhere in this specification at adjustable contacts of other voltage dividers, is meant the potential difference between such contact and some point of reference potential of the system, which may be one terminal of the voltage divider in question.

In order to adjust the contact 21a in accordance with the fluid mass flow through the conduit 11b, there is included in the conduit 11b a differential-pressure developing device such as a Venturi nozzle 22, the differential pressure across which is applied by way of fluid connections 23 and 24 to a differential-pressure bellows 25 connected to oppose the torque of a spiral spring 26 and connected also to adjust an adjustable inductor 27. The inductor 27 is connected in parallel with a resistor 28, having a manually adjustable contact 28a, across the supply terminals 17 to form a bridge circuit. However in the branch of the bridge circuit containing resistor 28 is serially connected a resistor 29 included in the conduit 11b and having a high temperature-coefficient-of-resistance and an adjustable portion of a resistor 30 having an adjustable contact 30a actuated by a pressure-responsive device 31 connected by way of the fluid connection 23 to the conduit 11b and responsive to the static pressure therein. Preferably, the capacity of the heat exchanger or cooler 11, 11a is sufficient to maintain the temperature of the outlet gases approximately at ambient temperature or even substantially constant, in which latter case the resistor 29 may be omitted. The unbalance voltage of the bridge 27, 28, 29, 30 is applied to the input circuit of an amplifier and phase shifter 31a energized from the supply circuit terminals 17 and having an output circuit connected to a phase winding 32a of a phase-responsive device such as a two-phase motor 32 having a second phase winding 32b connected to the supply terminals 17. The shaft of the motor 32 is connected by way of a clutch, represented schematically at 33, and a shaft or other suitable linkage mechanism 34 to rewind the spring 26 against the pressure of the bellows 25 to restore the system to equilibrium and also to adjust the adjustable contact 21a of voltage divider 21. As explained hereinafter, this portion of the system is effective to adjust the contact 21a so that its position, and therefore the electrical signal appearing thereat, constitutes an effect varying with the fluid mass flow through the conduit 11b.

The temperature-responsive system also includes means responsive jointly to the two effects derived as described, that is to the ratio of the differential pressure across the orifice 12 to the fluid mass flow through the conduit 11b, for developing a third effect representative of a temperature factor of the fluid in the conduit 10. This means may comprise the adjustable contact of voltage divider 20, the electrical signal at the adjustable contact 20a being representative of the density of the fluid in the conduit 10, as explained hereinafter.

In certain systems it may be sufficient to ascertain the density of the fluid in the conduit 10, this density varying with the temperature in accordance with the Equation 2a. If the pressure of the system and the gas constant of the fluid remain substantially constant, the density is representative of the absolute temperature of the fluid, varying inversely therewith, and the signal at the adjustable contact 20a may be taken off at the terminals 20b and utilized to provide an effect representative of the density and the temperature of the fluid in the conduit 10. This signal may be employed for indicating, recording or controlling operations.

In some installations, however, the static pressure of the fluid in the conduit 10 may be subject to considerable variation so that the density of the fluid is no longer accurately representative of its absolute temperature. In such cases, the system also includes means for developing an effect varying with the static pressure in the conduits 10 or 11. This means may take the form of a pressure-responsive device 35 connected by way of the fluid connection 10a to the conduit 10 and mechanically connected to actuate an adjustable contact 36a of a voltage divider 36 excited from the electrical signal appearing across one portion of the voltage divider 20, that is connected to the adjustable contact 20a and to one of the supply terminals 17.

The temperature-responsive system also includes means responsive jointly to the three effects derived as described above, specifically, responsive to the ratio of the product of the first effect representative of the differential pressure $h_w$ across orifice 12 and the second effect representative of the static pressure P in the conduit 10 to the square of the fluid mass flow $w$ for developing a fourth effect representative of the absolute temperature of the fluid in conduit 10. This means includes a voltage divider 37 connected directly across the supply terminals 17 and having an adjustable contact 37a, together with means for adjusting the contact 37a to balance the electrical signal thereat with that at the adjustable contact 36a of voltage divider 36, whereby the position of the adjustable contact 37a and the electrical signal thereat is representative of the desired temperature. To this end, the adjustable contacts 36a and 37a are interconnected in a balancing circuit including a balancing resistor 38 connected in the input circuit of an amplifier and phase shifter 39 excited from the supply terminals 17. The output circuit of the amplifier 39 is connected to a phase winding 40a of a phase-responsive device such as a two-phase motor 40 having a second phase winding 40b connected directly to the supply circuit terminals 17. The electrical signal appearing between the adjustable contact 37a and one of its terminals is applied to output terminals 41 from which it may be derived for indicating, recording or controlling operations; for example, for controlling the fuel-to-air ratio of the input to the internal combustion engine to maintain the combustion temperature constant. The voltage divider 37 may also be provided with a scale 37b with which the contact or pointer 37a cooperates to give a visual indication of the desired temperature.

As is apparent from Equations 2, 2a, and 3, the relationships between temperature T, pressure P, differential pressure $h_w$ and density D are all linear, while the relationships between temperature T and density D and mass flow $w$ follow a square-law function; therefore the voltage dividers 20 and 36 should have linear displacement-voltage characteristics, while the voltage divider 21 should be tapered to have an inverse square-law displacement-voltage characteristic. It will also be apparent that, since the adjustment, and therefore the position, of the adjustable contact of voltage divider 37 is linearly representative of the absolute temperature of the fluid in the conduit 10, this voltage divider should have a linear displacement-voltage characteristic so that the electrical signal appearing at the terminals 41 is also linearly representative of the absolute temperature of the fluid in the conduit 10.

The operation of the temperature-responsive system of the invention will be apparent from the foregoing detailed description. In brief, with the clutch 33 set to the position indicated, the bridge circuit 27, 28, 29 and 30 is balanced and the system is in equilibrium when adjusted to satisfy the relationships of Equation 1. To this end, the elements responsive to the differential pressure across the venturi 22 including the bellows 25, the spring 26 and the adjustable inductor 27, should be designed to impart to the inductor 27 a displacement-voltage characteristic following a square-root law. Similarly, the pressure-responsive device 31 and the voltage divider 30 should be designed to develop at the adjustable contact 30a a displacement-resistance characteristic following a square-root law, while the temperature-responsive resistor 29 included in the conduit 11b should have a temperature-resistance characteristic approximating an inverse square-root law. Then, by manually setting the adjustable contact 28a to take into account the constant $kA$ of the venturi 22, the rebalancing motor 32 is effective to rewind the spiral spring 26 to such a value as to rebalance the bridge 27, 28, 29 and 30 and simultaneously to adjust the contact 21a of voltage divider 21 by an amount such that its position is representative of the mass flow through the conduit 11b and the electrical signal thereat varies as the inverse square of such fluid mass flow.

In case the density only of the fluid in the conduit 10 is desired, the pressure-responsive device 35, voltage divider 36, voltage divider 37 and the rebalancing apparatus therefor may be omitted. In this case, the differential-pressure bellows 13, bridge 15, 16 and the rebalancing motor 19 operate in a manner similar to that corresponding to the elements in the mass-flow determining apparatus, described above, to set the adjustable contact 20a of voltage divider 20 at a position representative of the differential pressure across orifice 12. As explained above, the voltage divider 20 is energized with the electrical signal at contact 21a which varies as the inverse square of the fluid-mass flow, that is, the total signal applied to voltage divider 20 varies as $1/w^2$ and the signal at contact 20a is a fraction of the total signal varying with the differential pressure $h_w$ across the orifice 12, so that the electrical signal at contact 20a varies as $h_w \times 1/w^2$ or as the ratio $h_w/w^2$. Since according to Equation 7 the density factor $$\frac{1}{D}$$

is also equal to the quotient of the differential pressure $h_w$ across the orifice 12 and the square of the mass flow $w^2$, the electrical signal appearing between the adjustable contact 20a and one terminal of the voltage divider 20 satisfies this relation and is representative of the density factor $$\frac{1}{D}$$

This signal is applied to terminals 20b, from which it may be derived for indicating, recording or controlling operations.

If, however, it is desired to obtain an indication, an electrical signal or other effect representative of the absolute temperature of the fluid in the conduit 10, the pressure-responsive device 35, the voltage dividers 36 and 37 and associated balancing mechanism are utilized. Since the electrical signal appearing at the adjustable contact 20a is applied to the voltage divider 36, the electrical signal at the adjustable contact 36a represents the product of that appearing at the adjustable contact 20a and the static pressure of the fluid in the conduit 10, which determines the setting of contact 36a. This electrical signal satisfies the relations of Equation 6 and is therefore representative of the absolute temperature of the fluid in the conduit 10. This signal is balanced against that of the adjustable contact 37a of voltage divider 37 by means of the rebalancing amplifier 39 and motor 40 in a conventional manner. Since the displacement-voltage characteristic of the voltage divider 37 is linear and since, at balance, the electrical signal at the adjustable contact 37a is equal to that at the adjustable contact 36a, the position of adjustable contact 37a is also representative of the absolute temperature of the fluid in the conduit 10 and the contact 37a cooperates with the associated scale 37b to indicate such temperature. Simultaneously the electrical signal at the contact 37a, which is representative of the absolute temperature of the fluid in the conduit 10, is impressed on the terminals 41 from which it may be derived for indicating, recording or controlling purposes. In the system described, the differential pressure devices 13 and 25 and the pressure-responsive devices 31 and 35 are low-inertia means; that is they respond substantially instantaneously to variations in differential pressure or pressure as the case may be. In case the capacity of the heat exchanger or cooler 11, 11a is sufficient to maintain the temperature of the gases in the outlet 11b substantially constant so that resistor 29 may be omitted, as described above, the whole system becomes substantially inertialess and responds extremely rapidly to variations in temperature of the fluid in conduit 10.

In the temperature-responsive system as described above, the determination of the fluid mass flow through the conduit 11 was made by deriving an effect varying in accordance therewith, that is by measuring such fluid mass flow. However, in case it is convenient to determine the fluid mass flow by maintaining it constant at some preselected value, the system may be somewhat simplified. In such case, the ratio of the density factor as measured by the differential pressure $h_w$ to the mass flow, or the ratio of the temperature factor, which is the product of this density factor and the static pressure P, to the mass flow, is equal to such density factor or temperature factor itself. In this case, the clutch 33 is actuated to its right-hand position, as shown in the drawing, thereby connecting the motor 32 to actuate a throttle valve 42 in the conduit portion 11b. At the same time, the motor 32 is disconnected from the actuating mechanism 34 so that the spiral spring 26 opposing the bellows 25 is non-adjustable, while the adjustable contact 21a of voltage divider 21 may be set to any desired position, preferably such as to connect the voltage divider 20 directly across the supply terminals 17. With such a connection, the bridge circuit 27, 28, 29 and 30 is not rebalanced by the motor 32 but the motor 32 actuates the throttle 42 in such a manner that the fluid mass flow through the conduit 11b is such as to maintain the bridge circuit in balance. The value of this fluid mass flow which is maintained substantially constant by the mechanism may be adjusted by means of the manually adjustable contact 28a.

With this connection, the voltage divider 20 comprises means for developing an effect, such as an electrical signal at the output terminals 20b, which is representative of the differential pressure across the orifice 12 and therefore in accordance with Equation 5 is representative of the density factor $$\frac{1}{D}$$

of the fluid in the conduit 10. Furthermore, with this connection, the voltage divider 37 and its rebalancing amplifier 39 and motor 40 constitute means responsive jointly to the positions of the contacts 20a and 36a, which positions or effects are representative respectively of the differential pressure $h_w$ across the orifice 12 and the static pressure P in the conduit 10. That is, there is developed at contact 37a an effect varying with the product of these two effects, this last effect being the position and electrical signal at the adjustable contact 37a of voltage divider 37. Since the mass flow $w$ is maintained constant, the ratio of such product to the mass flow $w$ is equal to the product itself and the position of the contact 37a and the electrical signal thereat is representative of the absolute temperature of the fluid in the conduit 10. This relationship is due to the fact that the voltage divider 20 is connected directly across the supply circuit and has a linear displacement-voltage characteristic; the voltage divider 36 is connected across an adjustable portion of the voltage divider 20 and also has a linear displacement-voltage characteristic; while the third voltage divider 37 is connected directly across the supply terminals 17 and its adjustable contact 37a is adjusted to balance the electrical signal thereat with that at the adjustable contact 36a, whereby this apparatus satisfies the relationship of Equation 4 and the position and electrical signal at the contact 37a is representative of the desired temperature. It will be obvious that the clutch 33 may be omitted, if desired, and the system constructed to correspond to that with the clutch 33 in either position.

Figure 2:
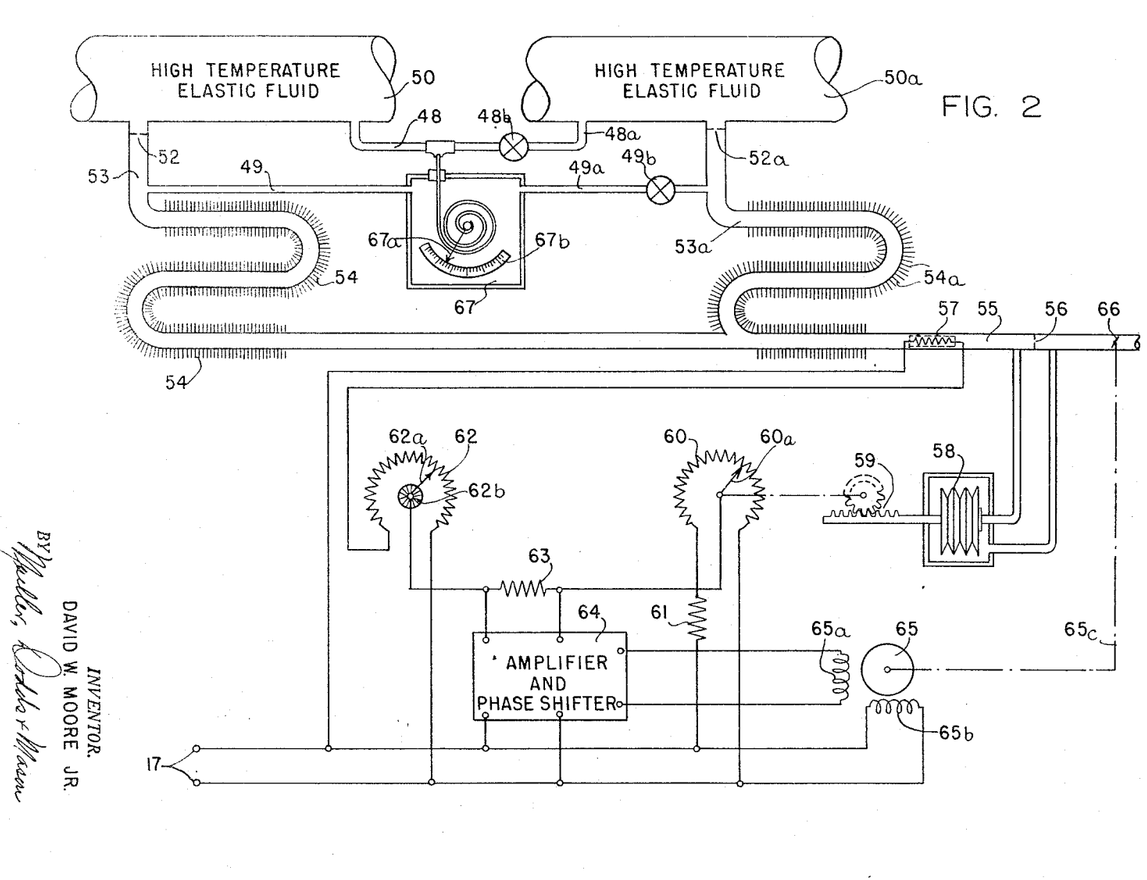
Fig. 2 is a diagram, partially schematic, of a modified form of a temperature-responsive system of the invention applied to the measurement of the average temperature of a plurality of combustion chambers of a jet propulsion engine.

In Fig. 2, there is represented a simplified system for deriving an effect representative of the average temperature of the high-temperature elastic fluid flow at a plurality of points, as in a plurality of conduits 50 and 50a which may be parts of the same system or included in the different fluid systems. In describing the operation of this simplified system of Fig. 2, the second conduit 50a and its associated apparatus will initially be disregarded. Again, an understanding of the characteristics and the principles of operation of the simplified system will be facilitated by a consideration of the fundamental relationships underlying it. As in the system of Fig. 1, a sample of the high-temperature fluid is bled off of the conduit 50 and passed through a differential-pressure developing device such as an orifice 52 in a conduit 53 provided with fins 54 and terminating in a second conduit 55 in which is disposed a second differential-pressure developing device or orifice 56. If the parameters of the flow through the orifice 52 are represented by a subscript 1 and those of the fluid flow through the orifice 56 represented by the subscript 2, then Equation 1 may be written as:

$$w = k_1 A_1 \sqrt{\frac{h_{w_1} P_1}{R T_1}} = k_2 A_2 \sqrt{\frac{h_{w_2} P_2}{R T_2}} \quad (8)$$

By making $k_1 A_1 = k_2 A_2$, this relationship may be simplified to:

$$T_1 = h_{w_1} \frac{T_2}{h_{w_2}} \quad (9)$$

If then the ratio $$\frac{T_2}{h_{w_2}}$$

is maintained constant, the temperature of the high-temperature fluid is represented by:

$$T_1 = C h_{w_1} \quad (10)$$

In other words, by maintaining the ratio $$\frac{T_2}{h_{w_2}}$$

substantially constant, the differential pressure across the orifice 52 is proportional to, and therefore representative of, the temperature of the fluid in the conduit 50 on a properly calibrated scale.

The system of Fig. 2 therefore comprises means for developing a first effect varying as a predetermined function of the volumetric fluid flow, that is the orifice 52 for developing a differential pressure. The orifice 52 has a predetermined fluid flow-differential pressure characteristic, that is, a given area and orifice constant. At the same time, the orifice 56 in conduit 55 is so designed that it comprises means for developing a second effect varying as the same predetermined function of the volumetric fluid flow of the cooled fluid; preferably it has the same predetermined characteristic as the orifice 52, as by having the same area and same orifice constant, although the constants of the two orifices may be different if their differential-pressure response follows the same law of variation. The system also includes means for developing a third effect varying with the temperature of the cooled fluid, for example a resistor 57 disposed in the conduit 55 and having a substantial temperature coefficient of resistance.

The system of Fig. 2 also comprises means responsive jointly to the effects developed by the orifice 56 and resistor 57 for maintaining constant the ratio of the temperature to which the resistor 57 is responsive and the differential pressure across the orifice 52 whereby, as explained above, the differental pressure across the orifice 52 is directly representative of the desired high temperature of the fluid in the conduit 50.

The ratio $$\frac{T_2}{h_{w_2}}$$

may be maintained constant by controlling the fluid flow through the conduits 53 and 55. To this end, the differential pressure across orifice 56 is applied to a differential pressure bellows 58 which is connected by way of rack and pinion 59 to an adjustable contact 60a of an adjustable resistor 60 connected across supply terminals 17 through a fixed resistor 61. Similarly, resistor 57 is connected in series with a voltage divider 62 across the supply terminals 17, the voltage divider 62 being provided with a contact 62a manually adjustable, as by a knob 62b. The resistance elements 60, 61 and 57, 62 comprise in effect a Wheatstone bridge, the unbalance voltage of which appears between the adjustable contact 62a and the junction between resistors 60 and 61. This unbalance voltage is applied to an unbalance resistor 63 connected to the input circuit of an amplifier and phase shifter 64 excited from the supply terminals 17 and provided with an output circuit connected to a phase winding 65a of a phase-responsive device, such as a two-phase motor 65, having a second phase winding 65b connected to the supply terminal 17. The motor 65 operates through a mechanism indicated schematically at 65c to adjust a throttle valve 66 included in the conduit 55.

With this arrangement, means responsive to the differential pressure across the orifice 52 is then effective to develop an effect representative of the desired temperature. This means may be in the form of a differential-pressure meter 67 of the Bourdon type having a pointer 67a and a scale 67b calibrated to indicate temperature directly, the differential pressure across the orifice 52 being applied to the inside and outside of the Bourdon tube by way of auxiliary conduits 48 and 49.

It is believed that the operation of so much of the system of Fig. 2 described will be apparent by analogy to the operation of the system of Fig. 1. In brief, the bridge circuit 60, 61, 57, 62 is balanced when the ratio $$\frac{T_2}{h_{w_2}}$$

is maintained constant at a preselected value determined by the setting of contact 62a. This is due to the fact that the resistance of resistor 57 varies directly with temperature $T_2$ while the portion of the resistor 60 included in the circuit varies inversely with the differential pressure $h_{w_2}$ across the orifice 56. Any unbalance voltage of the bridge circuit is amplified and utilized to actuate the motor 65 to adjust the throttle 66 in such a way as to restore the ratio $$\frac{T_2}{h_{w_2}}$$

to the constant value selected.

With the ratio $$\frac{T_2}{h_{w_2}}$$

maintained constant as described, it is seen from Equation 10 that the differential pressure across the orifice 52 is proportional to, and therefore directly representative of, the temperature of the fluid in the conduit 50. Therefore, the differential-pressure meter 67 is effective to indicate on a properly calibrated scale 67b the temperature of the fluid in conduit 50.

In Fig. 2, there is also represented an arrangement for obtaining the average temperature of the elastic fluid in a plurality of conduits 50 and 50a. In this case, there is also a differential-pressure developing device or orifice 52a disposed in a bleeder conduit 53a connected to conduit 50a and having the same predetermined fluid flow-differential pressure characteristic as the orifice 52. The conduit 53a also is provided with a fluid-translating and cooling means connected thereto, for example an extension of the conduit 53a provided with cooling fins 54a. The conduits 53 and 53a terminate in the common conduit 55 and the orifice 56 previously described constitutes a common differential-pressure developing device in such common conduit and having the same characteristic as the orifices 52 and 52a.

In this modification of the system, the differential-pressure meter 67 is connected also by way of auxiliary conduits 48a and 49a to respond to the differential pressure across the orifice 52a and therefore the meter 67 responds to the average of the differential pressure across the orifices 52 and 52a and indicates the average of the temperatures of the fluids in the conduits 50 and 50a. If desired, valves 48b and 49b may be included in the auxiliary conduits 48a and 49a, respectively, in case it is desired to respond only to the temperature of the fluid in conduit 50. It may be necessary or desirable to provide separate calibrated scales for meter 67 for use when responding to the fluid temperature of only one or both of the conduits 50 and 50a. In this modification of the invention, the characteristic of the orifice 56 may be matched to that of the orifices 52 and 52a by making the area of the orifice 56 equal to the sum of the areas of the orifices 52 and 52a and making all of the orifices 52, 52a and 56 of homologous design so that they have the same orifice constants $k$.

The auxiliary conduits 10a, 10b of Fig. 1 and 48, 48a and 49, 49a of Fig. 2 need transmit only static pressures; hence they should preferably be made sufficiently long to isolate the differential-pressure devices to which they are connected from the high-temperatures of their respective conduits 10, 50 and 50a.

Thus there is provided by the temperature-responsive system of the invention an effect, specifically a visual indication or an electrical signal, or both, which is continuously representative of the temperature of a high-temperature elastic fluid which may be within the range of 1700–3000° F. absolute and which at the same time includes no elements subject to high temperature which are subject to appreciable deterioration. In fact, the only elements in the system subjected to the extremely high temperatures are the orifices. These may be of tungsten or other suitable refractory material capable of withstanding high temperatures and preferably having a minimum temperature-coefficient-of-expansion so that the orifice area and orifice constant will not vary appreciably over substantial ranges of temperature. Furthermore, the system is applicable without change to the measurement of the temperature of extremely low-temperature elastic fluid and is also useful in providing a substantially instantaneous response to the temperature of elastic fluids of any temperature. At the same time, the various measuring and controlling components of the system of the invention may be located relatively remote from the conduits or combustion chambers carrying the extremely high-temperature gases so that they are affected thereby to a minimum degree. Furthermore the measuring and controlling elements comprising components of the system are simple and rugged in construction and extremely fast and reliable in operation.

While there have been described what are at present considered to be the preferred embodiments of the invention, it will be apparent to those skilled in the art that various changes and modifications may be made therein without departing from the spirit or scope of the invention.

What is claimed as new is:

1. A system for deriving an effect representative of a temperature factor of an elastic fluid flow in a conduit and of a temperature remote from ambient temperature comprising, means for developing an effect varying with the fluid flow of said fluid in said conduit, means for changing the temperature of said fluid to a workable temperature, and means responsive to the fluid flow and temperature of said workable-temperature fluid for controlling the fluid flow of said workable-temperature fluid to maintain constant a predetermined mass-flow factor including temperature, whereby said developed effect is representative of the desired temperature factor.

2. A system for deriving an effect representative of a temperature factor of an elastic fluid flow in a conduit and of a temperature remote from ambient temperature comprising, means for developing an effect varying with the fluid flow of said fluid in said conduit, heat exchanger means for changing the temperature of said fluid approximately to ambient temperature, and means responsive to the fluid flow and temperature of said workable-temperature fluid for controlling the fluid flow of said workable-temperature fluid to maintain constant a predetermined mass-flow factor including temperature, whereby said developed effect is representative of the desired temperature factor.

3. A system for deriving an effect representative of a temperature factor of a high-temperature elastic fluid flow in a conduit comprising, means for developing an effect varying with the fluid flow of said high-temperature fluid in said conduit, means for cooling said fluid to a workable temperature, and means responsive to the fluid flow and temperature of said workable-temperature fluid for controlling the fluid flow of said cooled fluid to maintain constant a predetermined mass-flow factor including temperature, whereby said developed effect is representative of the desired temperature factor.

4. A system for deriving an effect representative of the temperature of an elastic fluid flow in a conduit and of a temperature remote from ambient temperature comprising, means for developing an effect varying with the fluid flow of said fluid in said conduit, means for developing an effect varying with the static pressure in said conduit, means for changing the temperature of said fluid to a workable temperature, means responsive to the mass-flow of said workable-temperature fluid for controlling the fluid flow of said workable-temperature fluid to maintain constant a predetermined mass-flow, and means responsive jointly to said two effects for developing a third effect representative of the desired temperature.

5. A system for deriving an effect representative of the temperature of an elastic fluid flow in a conduit and of a temperature remote from ambient temperature comprising, means for developing an effect varying with the fluid flow of said fluid in said conduit, means for developing an effect varying with the static pressure in said conduit, means for changing the temperature of said fluid to a workable temperature, means responsive to the mass-flow of said workable-temperature fluid for controlling the fluid flow of said workable-temperature fluid to maintain constant a predetermined mass-flow, and means responsive to the product of said two effects for developing a third effect representative of the desired temperature.

6. A system for deriving an electrical signal representative of the temperature of an elastic fluid flow in a conduit and of a temperature remote from ambient temperature comprising, means for developing an electrical signal varying with the fluid flow of said fluid in said conduit, means for developing an electrical signal varying with the static pressure in said conduit, means for changing the temperature of said fluid to a workable temperature, means responsive to the mass-flow of said workable-temperature fluid for controlling the fluid flow of said workable-temperature fluid to maintain constant a predetermined mass-flow, and means responsive jointly to said two signals for developing a third electrical signal representative of the desired temperature.

7. A system for deriving an electrical signal representative of the temperature of an elastic fluid flow in a conduit and of a temperature remote from ambient temperature comprising, an electrical supply circuit, a first voltage divider having an adjustable contact, means for adjusting said contact in response to the fluid flow of said fluid in said conduit, a second voltage divider having an adjustable contact, means for adjusting said second divider contact in response to the static pressure in said conduit, one of said dividers being connected to said supply circuit and the other of said dividers being connected across an adjustable portion of said one divider, means for changing the temperature of said fluid to a workable temperature, means responsive to the mass-flow of said workable-temperature fluid for controlling the fluid flow of said workable-temperature fluid to maintain a predetermined constant mass-flow, a third voltage divider connected to said supply circuit and having an adjustable contact, and means including a balancing circuit responsive to the signal at the contact of said other of said dividers for adjusting said third divider contact to balance the signal thereat with the signal at the contact of said other of said dividers, whereby the position of said third divider contact is representative of the temperature of said remote-temperature fluid.

8. A system for deriving an effect representative of a temperature factor of an elastic fluid flow in a conduit and of a temperature remote from ambient temperature comprising, means for developing an effect varying with the fluid flow of said high-temperature fluid in said conduit, means for changing the temperature of said fluid to a workable temperature, means for deriving a second effect varying with a mass-flow factor including temperature of said workable-temperature fluid, and means responsive jointly to said two effects for developing a third effect representative of the desired temperature factor.

9. A system for deriving an effect representative of the temperature of an elastic fluid flow in a conduit and of a temperature remote from ambient temperature comprising, means for developing an effect varying with the fluid flow of said fluid in said conduit, means for developing an effect varying with the static pressure in said conduit, means for changing the temperature of said fluid to a workable temperature, means for deriving a third effect varying with the mass-flow of said workable-temperature fluid, and means responsive jointly to said three effects for developing a fourth effect representative of the desired temperature.

10. A system for deriving an effect representative of the temperature of an elastic fluid flow in a conduit and of a temperature remote from ambient temperature comprising, means for developing an effect varying with the fluid flow of said fluid in said conduit, means for developing an effect varying with the static pressure in said conduit, means for changing the temperature of said fluid to a workable temperature, means for deriving a third effect varying with the mass-flow of said workable-temperature fluid, and means responsive to the product of said first and second effects divided by the square of said third effect for developing a fourth effect representative of the desired temperature.

11. A system for deriving an effect representative of the temperature of an elastic fluid flow in a conduit and of a temperature remote from ambient temperature comprising, means for developing a first effect varying with the volumetric flow of said fluid in said conduit, means for changing the temperature of said fluid to a workable temperature, means for developing a second effect varying with the volumetric flow of said workable-temperature fluid, means for developing a third effect varying with the temperature of said workable-temperature fluid, and means responsive jointly to said second and third effects for maintaining constant the ratio of said third effect to said second effect, whereby said first effect is representative of the desired temperature.

12. A system for deriving an effect representative of the temperature of an elastic fluid flow in a conduit and of a temperature remote from ambient temperature comprising, means for developing a first effect varying as a predetermined function of the fluid flow of said fluid in said conduit, means for changing the temperature of said fluid to a workable temperature, means for developing a second effect varying as the same predetermined function of the fluid flow of said workable-temperature fluid, means for developing a third effect varying with the temperature of said workable-temperature fluid, and means responsive jointly to said second and third effects for maintaining constant the ratio of said third effect to said second effect, whereby said first effect is representative of the desired temperature.

13. A system for deriving an effect representative of a temperature factor of an elastic fluid flow in a conduit comprising, means for developing a first effect varying with the volumetric flow of said fluid in said conduit, means for determining the value of a predetermined mass-flow factor of the fluid flow through said conduit, and means for developing a second effect varying with the relative values of said volumetric flow effect and said mass-flow factor and representative of said temperature factor.

14. A system for deriving an effect representative of a temperature factor of an elastic fluid flow in a conduit comprising, means for developing a first effect varying with the volumetric flow of said fluid in said conduit, means for determining the fluid mass flow through said conduit, and means for developing a second effect varying with the relative values of said volumetric flow effect and said mass flow and representative of said temperature factor.

15. A system for deriving an effect representative of the temperature of an elastic fluid flow in a conduit comprising, means for developing a first effect varying with the volumteric flow of said fluid in said conduit, means for developing a second effect varying with the static pressure in said conduit, means for determining the value of a predetermined mass-flow factor of the fluid flow through said conduit, and means for developing a third effect varying with the ratio of the product of said two effects to said fluid mass-flow factor and representative of the desired temperature.

16. A system for deriving an effect representative of a temperature factor of an elastic fluid flow in a conduit comprising, means for developing a first effect varying with the volumetric flow of said fluid in said conduit, means for deriving a second effect varying with a predetermined mass-flow factor of the fluid flow through said conduit, and means for developing a third effect varying with the ratio of said first effect to said second effect and representative of said temperature factor.

17. A system for deriving an effect representative of a temperature factor of an elastic fluid flow in a conduit comprising, means for developing a first effect varying with the volumetric flow of said fluid in said conduit, means responsive to the fluid flow through said conduit and to the temperature thereof for maintaining substantially constant a predetermined mass-flow factor including temperature of the fluid flow through said conduit, whereby said first effect is representative of said temperature factor.

18. A system for deriving an effect representative of the temperature of an elastic fluid flow in a conduit comprising, means for developing a first effect varying with the volumetric flow of said fluid in said conduit, means for developing a second effect varying with the static pressure in said conduit, means responsive to the fluid flow through said conduit for maintaining substantially constant a predetermined mass-flow factor of the fluid flow through said conduit, and means for developing a third effect varying with the product of said first two effects and representative of the desired temperature.

19. A system for deriving an effect representative of a temperature factor of an elastic fluid flow in a conduit and of a temperature remote from ambient temperature comprising, means for developing an effect varying with the volumetric flow of said fluid in said conduit, means for changing the temperature of said fluid to a workable temperature, means for determining the value of a predetermined mass-flow factor of the fluid flow of said workable-temperature fluid, and means for developing a second effect varying with the relative values of said volumetric flow and said mass-flow factor and representative of said temperature factor.

20. A system for deriving an effect representative of a temperature factor of a variable-temperature elastic fluid flow in a conduit comprising, low-inertia means for developing a first effect varying with the volumetric flow of said fluid in said conduit, heat-exchanger means for changing the temperature of said fluid to a substantially constant temperature, low-inertia means for determining the value of a predetermined mass-flow factor of the fluid flow through said conduit, and low-inertia means for developing a second effect varying with the relative values of said volumetric flow effect and said mass-flow factor and representative of the instantaneous value of said temperature factor.

21. A system for deriving an effect representative of the temperature of an elastic fluid flow in a first conduit and of a temperature remote from ambient temperature comprising, a first differential-pressure developing device in said conduit having a predetermined fluid flow-differential pressure characteristic, fluid-translating and heat-exchanging means connected to said conduit and terminating in a second conduit, a second differential-pressure developing device in said second conduit having the same predetermined characteristic, means for developing an effect representative of the temperature of said translated fluid, means responsive to said temperature effect and the differential pressure developed by said second device for controlling the fluid flow through said conduits to maintain constant the ratio of said temperature effect to the differential pressure developed by said second device, and means responsive to the differential pressure developed by said first device for developing an effect representative of the desired temperature.

22. A system for deriving an effect representative of the temperature of an elastic fluid flow in a first conduit and of a temperature remote from ambient temperature comprising, a first orifice in said conduit having a given area and constant, fluid-translating and heat-exchanging means connected to said conduit and terminating in a second conduit, a second orifice in said second conduit having the same area and constant as said first orifice, means for developing an effect representative of the temperature of said translated fluid, means responsive to said temperature effect and the differential pressure developed by said second device for controlling the fluid flow through said conduits to maintain constant the ratio of said effect to the differential pressure developed by said second orifice, and means responsive to the differential pressure developed by said first orifice for developing an effect representative of the desired temperature.

23. A system for deriving an effect representative of the temperature of an elastic fluid flow in a first conduit and of a temperature remote from ambient temperature comprising, a first differential-pressure developing device in said conduit having a predetermined constant, fluid-translating and heat-exchanging means connected to said conduit and terminating in a second conduit, a second differential-pressure developing device in said second conduit having the same predetermined constant, means for developing an effect representative of the temperature of said translated fluid, means responsive to said temperature effect and the differential pressure developed by said second device for controlling the fluid flow through said conduits to maintain constant the ratio of said effect to the differential pressure developed by said second device, and a differential-pressure meter connected across said first device and calibrated to indicate the desired temperature.

24. A system for deriving an effect representative of the average temperature of an elastic fluid flow in a plurality of conduits and of a temperature remote from ambient temperature comprising, a plurality of differential-pressure developing devices individually disposed in said conduits and having the same predetermined fluid flow-differential pressure characteristic, fluid-translating and heat-exchanging means connected to said conduits and terminating in a common conduit, a common differential-pressure developing device in said common conduit and having the same predetermined characteristic, means for developing an effect representative of the temperature of said translated fluid, means responsive to said temperature effect and the differential pressure developed by said common device for controlling the fluid flow through said common conduit to maintain constant the ratio of said effect to the differential pressure developed by said common device, and means responsive to the average differential pressure developed by said plurality of devices for developing an effect representative of the desired temperature.

25. A system for deriving an effect representative of the average temperature of an elastic fluid flow in a plurality of conduits and of a temperature remote from ambient temperature comprising, a plurality of differential-pressure developing devices individually disposed in said conduits and having the same predetermined fluid flow-differential pressure characteristic, fluid-translating and heat-exchanging means connected to said conduits and terminating in a common conduit, a common differential-pressure developing device in said common conduit and having the same predetermined characteristic, means for developing an effect representative of the temperature of said translated fluid, means responsive to said temperature effect and the differential pressure developed by said common device for controlling the fluid flow through said common conduit to maintain constant the ratio of said effect to the differential pressure developed by said common device, and a differential-pressure meter connected to respond to the average differential pressure across said plurality of devices and calibrated to indicate the desired temperature.

26. The method of deriving an effect representative of a temperature factor of an elastic fluid flow in a conduit and of a temperature remote from ambient temperature which comprises, developing an effect varying with the fluid flow of said high-temperature fluid in said conduit, changing the temperature of said fluid to a workable temperature, and controlling the fluid flow of said workable-temperature fluid to maintain constant a predetermined mass-flow factor including temperature, whereby said developed effect is representative of the desired temperature factor.

27. The method of deriving an effect representative of a temperature factor of an elastic fluid flow in a conduit which comprises, developing a first effect varying with the volumetric flow of said fluid in said conduit, determining a predetermined mass-flow factor of the fluid flow through said conduit, and developing a second effect varying with the relative values of said volumetric flow effect and said mass-flow factor and representative of said temperature factor.

28. The method of deriving an effect representative of the temperature of an elastic fluid flow in a conduit which comprises, developing a first effect varying with the volumetric flow of said fluid in said conduit, developing a second effect varying with the static pressure in said conduit, maintaining substantially constant the fluid mass flow through said conduit, and developing a third effect varying with the product of said first two effects and representative of the desired temperature.

29. A system for deriving an effect representative of a temperature factor of an elastic fluid at a point in the vicinity of a container and of a temperature remote from ambient temperature comprising, means for establishing an elastic fluid flow between said point and a remote point, means at one of said points for developing an effect varying with said fluid flow, means between said points for changing the temperature of said fluid to a workable temperature, and means at the other of said points responsive to the fluid flow and temperature of said workable-temperature fluid for determining a mass-flow factor of said fluid flow including temperature, said determined mass-flow factor being reactive upon said developed effect, whereby said developed effect is representative of the desired temperature factor.

30. A system for deriving an effect representative of a temperature factor of an elastic fluid at a point in the vicinity of a container comprising, means for establishing an elastic fluid flow between said point and a remote point, means for developing an effect varying with the volumetric fluid flow, and means responsive to the fluid flow at said remote point for maintaining substantially constant a predetermined mass-flow factor of said fluid flow, whereby said effect is representative of said temperature factor.

31. The method of deriving an effect representative of a temperature factor of an elastic fluid at a point in the vicinity of a container and of a temperature remote from ambient temperature which comprises, establishing an elastic fluid flow between said point and a remote point, developing an effect varying with said fluid flow, changing the temperature of said fluid to a workable temperature, and determining a mass-flow factor of said fluid flow including temperature, whereby said developed effect is representative of the desired temperature factor.

32. A pneumatic apparatus responsive to a temperature factor of an elastic-fluid source of variable static pressure comprising: a conduit in fluid connection with said source; a first constriction in said conduit in the vicinity of said source; a second constriction in said conduit spaced from said source; said conduit including provisions for cooling said fluid in its passage between said constrictions; means responsive to the fluid flow at said second orifice for maintaining substantially constant predetermined characteristics of fluid flow at said second orifice; and means responsive to the relative pressures on opposite sides of said first constriction for developing an effect representative of the desired temperature factor.

33. A pneumatic apparatus responsive to a temperature factor of an elastic-fluid source of variable static pressure comprising: a conduit in fluid connection with said source; a first constriction in said conduit in the vicinity of said source; a second constriction in said conduit spaced from said source; said conduit including provisions for cooling said fluid in its passage between said constrictions; means responsive to the fluid flow at said second orifice for maintaining substantially constant predetermined characteristics of fluid flow at said second orifice; and means including a differential-pressure-responsive device connected across said first constriction for developing an effect representative of the desired temperature factor.

DAVID W. MOORE, Jr.

REFERENCES CITED

The following references are of record in the file of this patent:

UNITED STATES PATENTS

| Number | Name | Date |
|---|---|---|
| Re. 11,413 | Uehling et al. | Apr. 17, 1894 |
| 339,756 | Frew | Apr. 13, 1866 |
| 554,323 | Uehling et al. | Feb. 11, 1896 |
| 639,317 | Uehling et al. | Dec. 19, 1899 |
| 773,684 | Speller | Nov. 1, 1904 |
| 1,455,633 | Lungaard | May 15, 1923 |
| 1,630,307 | Norwood et al. | May 31, 1927 |
| 1,630,318 | Tate | May 31, 1927 |
| 2,317,807 | Ryder | Apr. 27, 1943 |
| 2,352,312 | Donaldson | June 27, 1944 |